US012767025B2

(12) United States Patent
Panduranga et al.

(10) Patent No.: US 12,767,025 B2
(45) Date of Patent: Oct. 20, 2026

(54) HEADREST MOUNTING ASSEMBLY

(71) Applicant: JAGUAR LAND ROVER LIMITED, Whitley (GB)

(72) Inventors: Emmal Panduranga, Whitley (GB); Radu-Andrei Stanciu, Whitley (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 162 days.

(21) Appl. No.: 18/702,292

(22) PCT Filed: Oct. 6, 2022

(86) PCT No.: PCT/EP2022/077833
§ 371 (c)(1),
(2) Date: Apr. 17, 2024

(87) PCT Pub. No.: WO2023/066675
PCT Pub. Date: Apr. 27, 2023

(65) Prior Publication Data

US 2025/0249810 A1 Aug. 7, 2025

(30) Foreign Application Priority Data

Oct. 21, 2021 (GB) ..................................... 2115143

(51) Int. Cl.
*B60N 2/897* (2018.01)
*B60N 2/809* (2018.01)
*B60N 2/882* (2018.01)

(52) U.S. Cl.
CPC ............. *B60N 2/897* (2018.02); *B60N 2/809* (2018.02); *B60N 2/882* (2018.02)

(58) Field of Classification Search
CPC ...................................................... B60N 2/897
See application file for complete search history.

(56) References Cited

U.S. PATENT DOCUMENTS

| | | | |
|---|---|---|---|
| 9,315,135 B2 | 4/2016 | Kitou et al. | |
| 2002/0050729 A1 | 5/2002 | Nakano | |

(Continued)

FOREIGN PATENT DOCUMENTS

| | | |
|---|---|---|
| DE | 102014211526 A1 | 12/2014 |
| EP | 2614751 A1 | 7/2013 |

OTHER PUBLICATIONS

Great Britain Intellectual Property Office, Combined Search and Examination Report under Sections 17 and 18(3) Issued in Application No. GB2115143.6, Mar. 18, 2022, 6 pages.

(Continued)

*Primary Examiner* — Nicholas McFall
(74) *Attorney, Agent, or Firm* — McCoy Russell LLP

(57) ABSTRACT

A headrest mounting assembly for mounting a headrest on a cross member of a seat back includes a mounting bracket having a centre portion, a first side portion and a second side portion. A first guide channel is provided for receiving a first headrest interconnecting member; and a second guide channel is provided for receiving a second headrest interconnecting member. The first and second guide channels are fastened to the centre portion of the mounting bracket. The first side portion is disposed outboard of the first guide channel on a first side of the mounting bracket; and the second side portion is disposed outboard of the second guide channel on a second side of the mounting bracket. The first and the second side portions are each configured to be fastened to the seat back outboard of the first and second guide channels respectively.

13 Claims, 6 Drawing Sheets

(56) References Cited

U.S. PATENT DOCUMENTS

| | | | | |
|---|---|---|---|---|
| 2010/0156152 | A1 | 6/2010 | Chen et al. | |
| 2015/0061341 | A1 | 3/2015 | Graf et al. | |
| 2015/0091356 | A1* | 4/2015 | Ozaki | B60N 2/803 297/391 |
| 2017/0174106 | A1 | 6/2017 | Stein et al. | |
| 2018/0072202 | A1 | 3/2018 | Kumazaki et al. | |
| 2019/0092198 | A1 | 3/2019 | Inoue et al. | |

OTHER PUBLICATIONS

ISA European Patent Office, International Search Report and Written Opinion Issued in Application No. PCT/EP2022/077833, Feb. 7, 2023, WIPO, 11 pages.

* cited by examiner

HEADREST MOUNTING ASSEMBLY

CROSS REFERENCE TO RELATED APPLICATIONS

The present application is a U.S. National Phase of International Application No. PCT/EP2022/077833 entitled "HEADREST MOUNTING ASSEMBLY," and filed on Oct. 6, 2022. International Application No. PCT/EP2022/077833 claims priority to Great Britain Patent Application No. 2115143.6 filed on Oct. 21, 2021. The entire contents of each of the above-listed applications are hereby incorporated by reference for all purposes.

TECHNICAL FIELD

The present disclosure relates to a headrest mounting assembly. Aspects of the invention relate to a headrest mounting assembly, a vehicle seat comprising a headrest mounting assembly; and a vehicle comprising one or more vehicle seat.

BACKGROUND

It is known to incorporate a headrest mounting assembly into a seat back of a vehicle seat. A known headrest mounting assembly comprises a bracket that is fastened to the seat frame. It has been determined that increasing the stiffness of the headrest mounting assembly may provide improved safety for a seat occupant, for example in the event of a collision involving the vehicle.

It is an aim of the present invention to address one or more of the disadvantages associated with the prior art.

SUMMARY OF THE INVENTION

Aspects and embodiments of the invention provide a headrest mounting assembly, a vehicle seat comprising a headrest mounting assembly; and a vehicle comprising one or more vehicle seat as claimed in the appended claims.

Within the scope of this application it is expressly intended that the various aspects, embodiments, examples and alternatives set out in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

A headrest mounting assembly 1 in accordance with an embodiment of the present invention is described herein with reference to the accompanying Figures.

Figure 1:
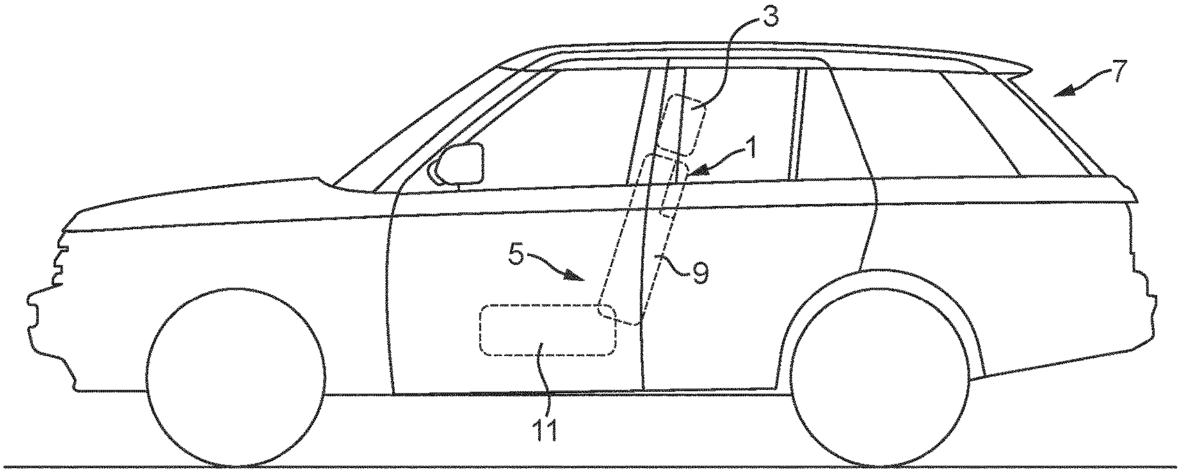
FIG. 1 shows a schematic representation of a vehicle seat incorporating a headrest mounting assembly in accordance with an embodiment of the present invention.
Figure 2:
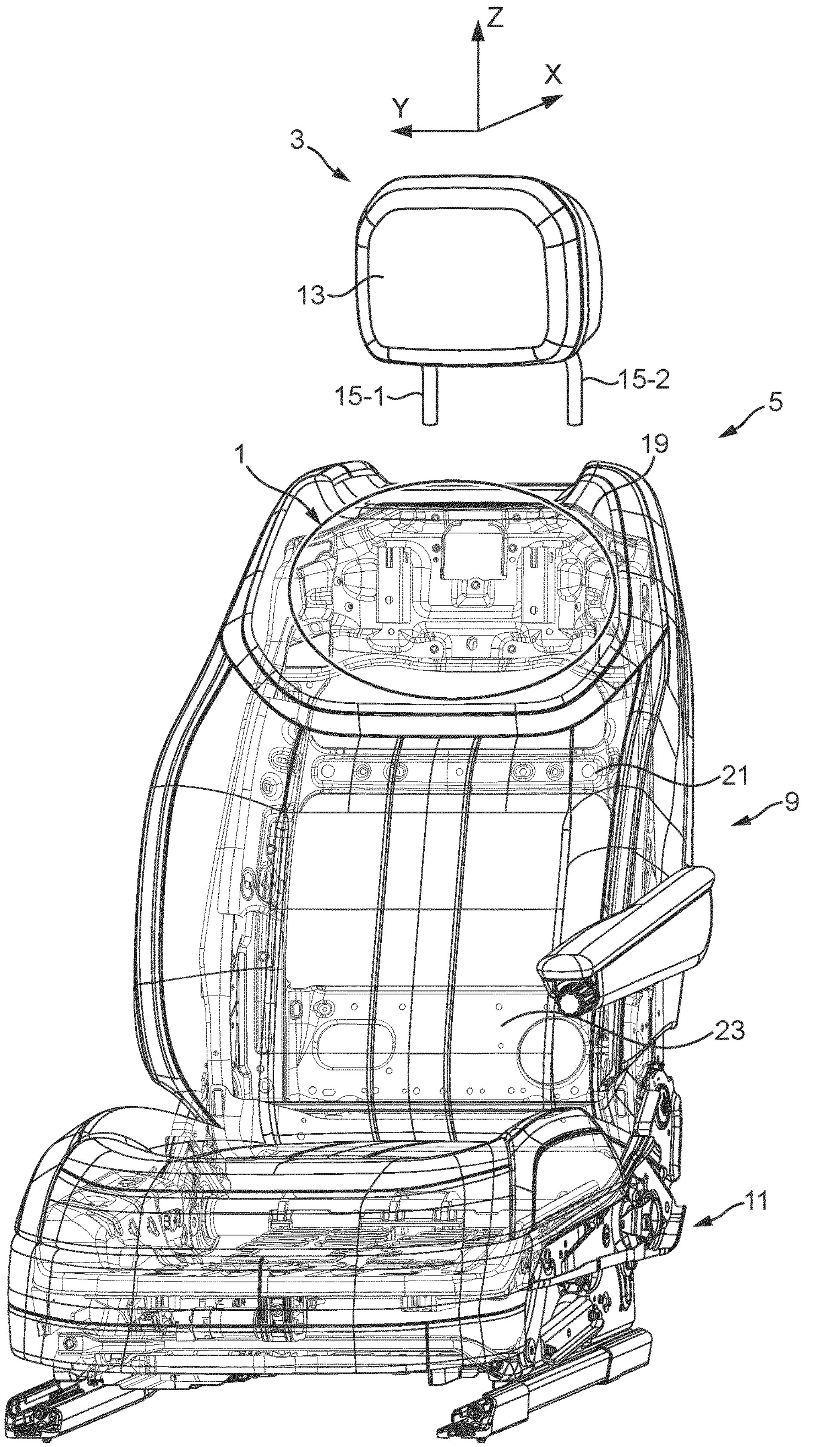
FIG. 2 shows a perspective view of the vehicle seat in the vehicle shown in FIG. 1.

The headrest mounting assembly 1 is suitable for mounting a headrest 3 on a vehicle seat 5. The vehicle seat 5 is for use in a vehicle 7. The vehicle 7 typically comprises a plurality of the vehicle seats 5. As shown in FIG. 1, the vehicle 7 in the present embodiment is an automobile. It will be understood that the headrest mounting assembly 1 may be used in other types of vehicles. As shown in FIGS. 1 and 2, the vehicle seat 5 comprises a seat back 9 and a seat base 11. The longitudinal and/or vertical position of the vehicle seat 5 may be adjusted in conventional manner. Alternatively, or in addition, an incline of the seat back 9 relative to the seat base 11 may be adjusted. Other aspects of the vehicle seat 5 may be adjusted, such as lumbar support or side bolsters.

The headrest mounting assembly 1 is defined with reference to a local reference frame comprising a longitudinal axis X, a transverse axis Y and a vertical axis Z. The vertical axis Z is a central axis of the headrest mounting assembly 1 and, in the assembled vehicle seat 5, is parallel to a central longitudinal axis of the seat back 9. The relative lateral position of components and features of the headrest mounting assembly 1 and the seat back 9 are described herein with reference to the XZ plane (i.e. the plane defined by the longitudinal axis X and the vertical axis Z) of the headrest mounting assembly 1. A component or feature disposed further from the XZ plane (in a transverse direction) is described herein as being outboard or in an outboard position. A component or feature disposed closer to the XZ plane (in a transverse direction) is described herein as being inboard or in an inboard position.

As shown in FIG. 2, the headrest 3 is mounted to the seat back 9. The headrest 3 comprises a support member 13, a first interconnecting members 15-1 and a second interconnecting member 15-2. The first and second interconnecting members 15-1, 15-2 locate in the headrest mounting assembly 1 to mount the headrest 3 to the seat back 9. The first and second interconnecting members 15-1, 15-2 comprise metal rods or tubes extending substantially parallel to each other. The first and second interconnecting members 15-1, 15-2 may optionally comprise one or more notches (not shown) for cooperating with a height adjustment mechanism (not shown) to enable the height of the headrest 3 to be adjusted.

Figure 3:
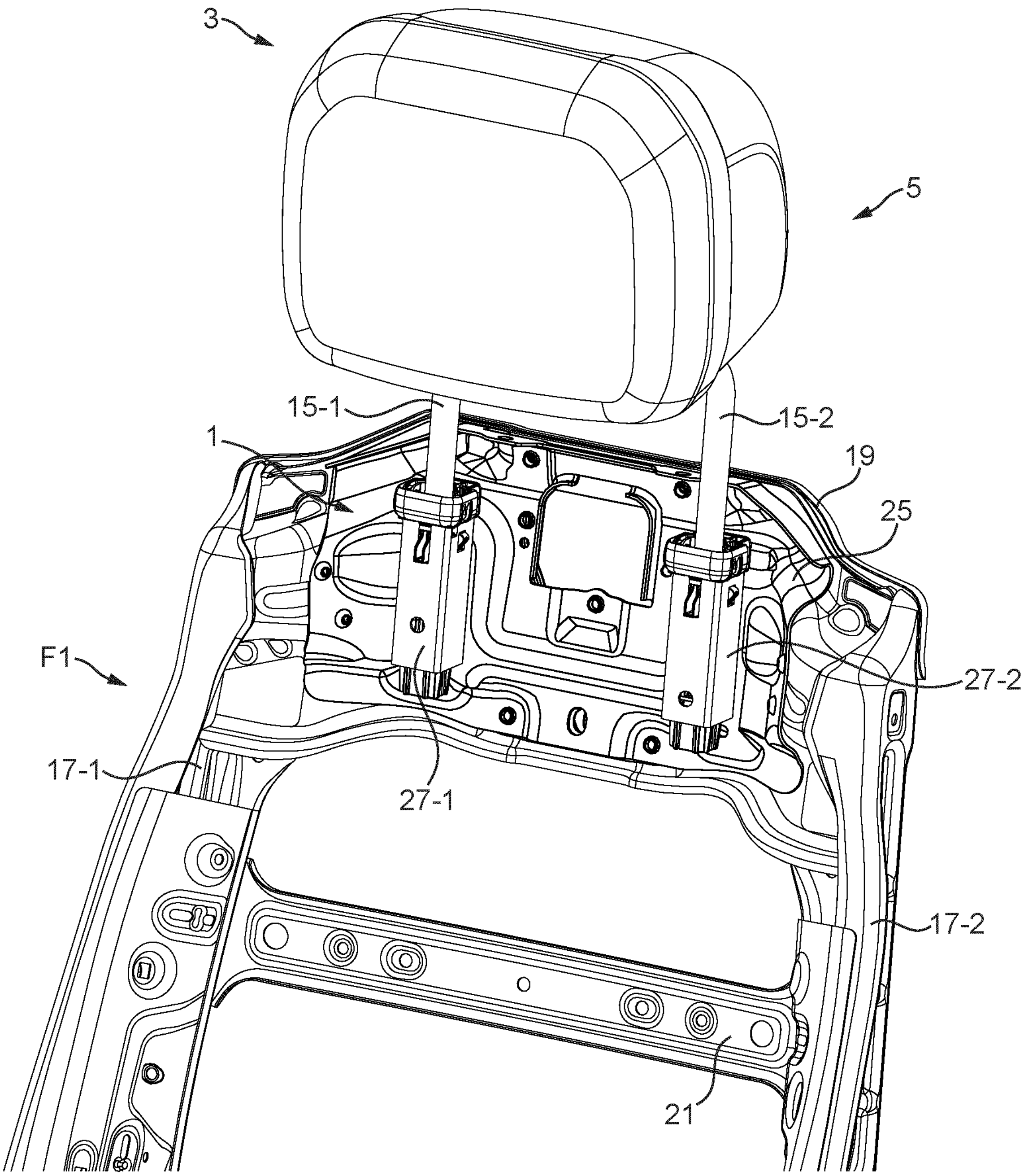
FIG. 3 shows a first perspective view of the headrest mounting assembly fastened to an upper portion of the vehicle seat shown in FIG. 2.
Figure 4:
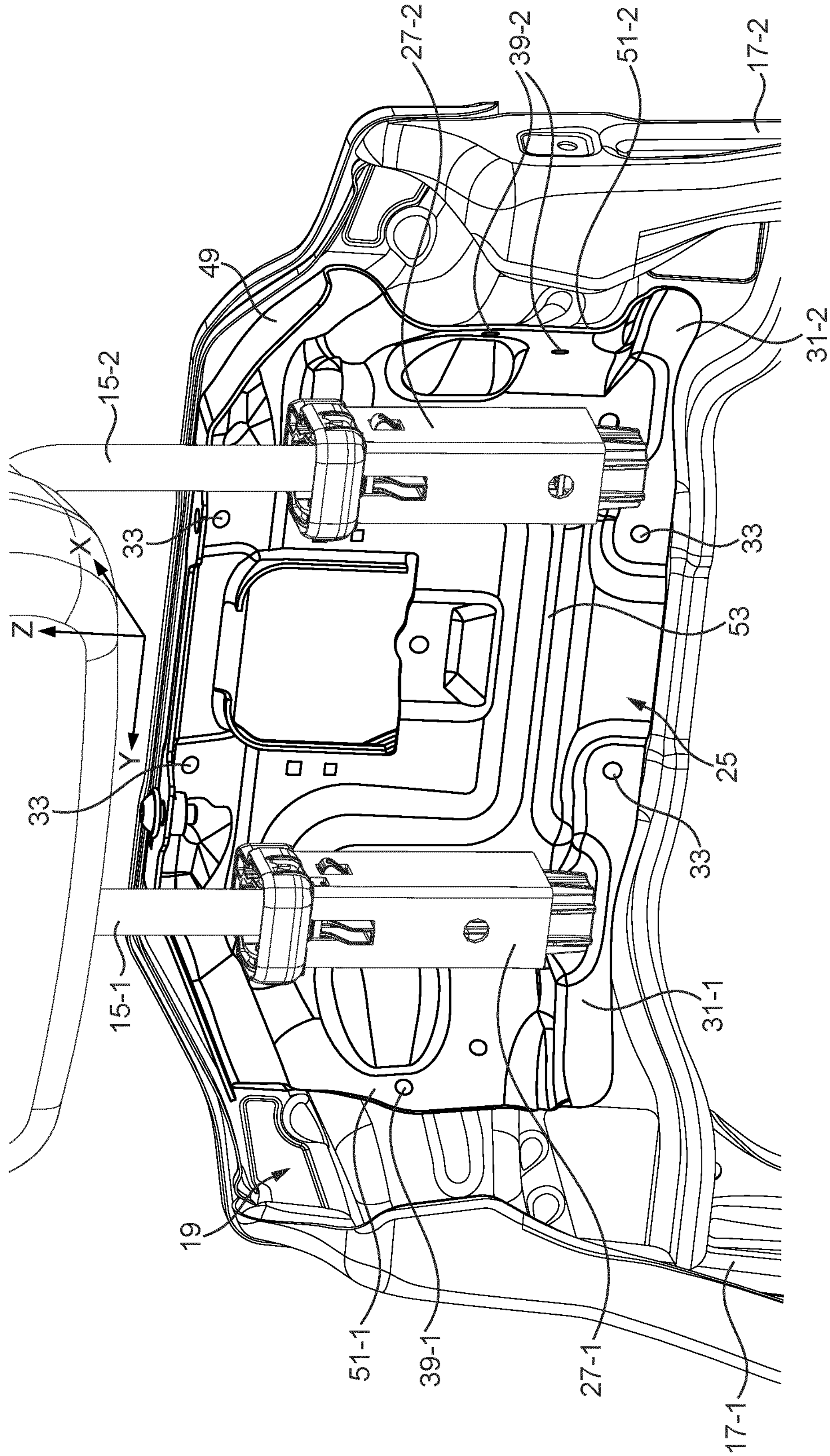
FIG. 4 shows a second perspective view of the headrest mounting assembly fastened to an upper portion of the vehicle seat shown in FIG. 2.

As shown in FIGS. 2 and 3, the seat back 9 comprises a frame assembly F1 composed of a plurality of frame members. The frame assembly F1 in the present embodiment comprises first and second side members 17-1, 17-2, a first cross member 19, a second cross member 21 and a third cross member 23. The first, second and third cross members 19, 21, 23 extend between the first and second side members 17-1, 17-2. The first cross member 19 is disposed at the top of the seat back 9. The second cross member 21 is disposed in the middle of the seat back 9. The third cross member 23 is disposed at the bottom of the seat back 9. The headrest mounting assembly 1 is fastened to the first cross member 19 in the present embodiment. It will be understood that the composition of the frame assembly F1 may be modified.

Figure 6:
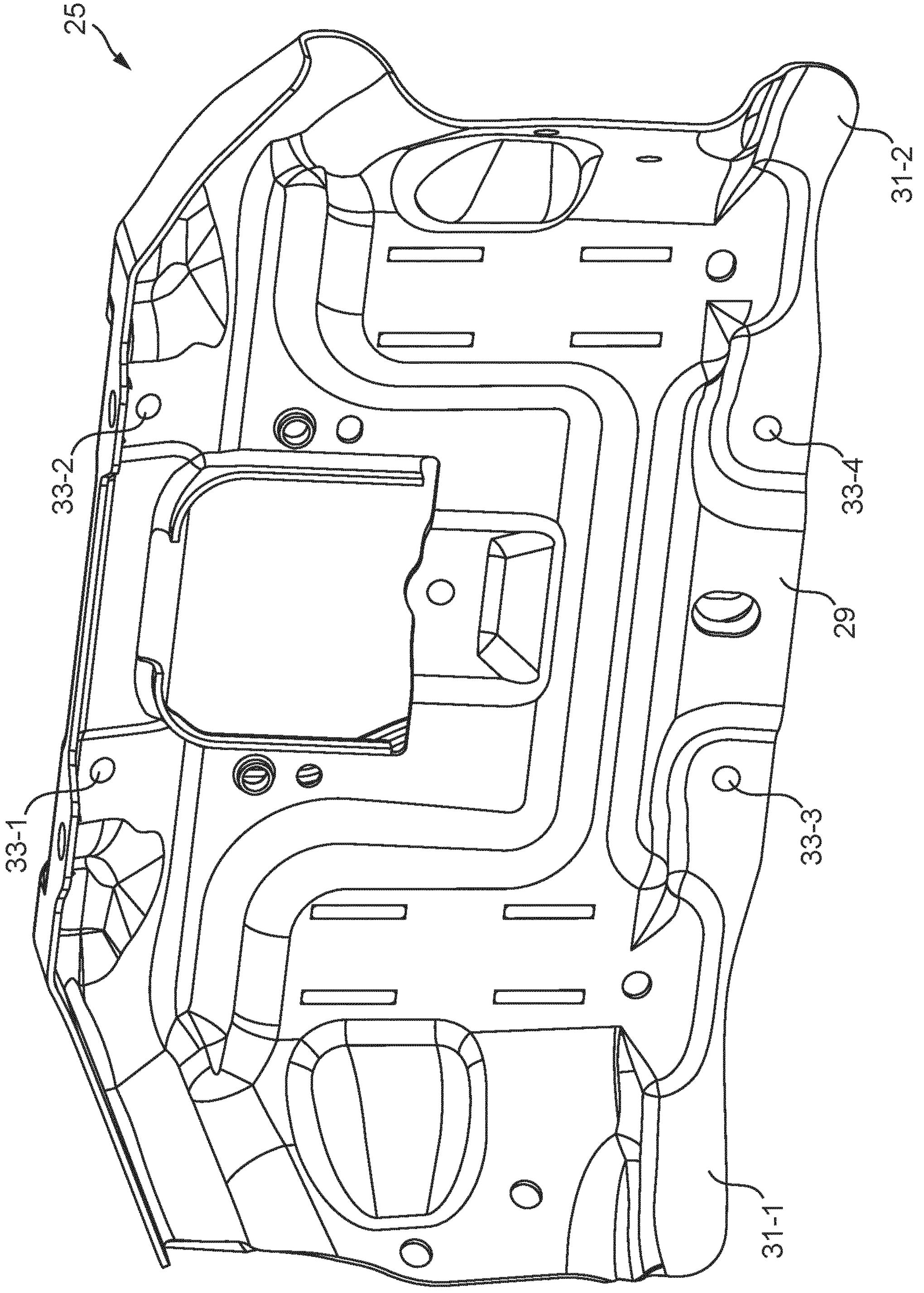
FIG. 6 shows a perspective view of a mounting bracket.

The headrest mounting assembly 1 comprises a mounting bracket 25, a first guide channel 27-1 and a second guide channel 27-2. The mounting bracket 25 comprises a centre portion 29, a first side portion 31-1 and a second side portion 31-2. The mounting bracket 25 has a unitary structure, for example comprising a formed metal plate, as shown in FIG. 6. The centre portion 29, the first side portion 31-1 and the second side portion 31-2 are formed integrally. In use, the centre portion 29 locates centrally in the seat back 9. The mounting bracket 25 is mounted to the first cross member 19 to provide a fixed support for the headrest 3. The centre portion 29 comprises upper and lower central fixing apertures 33 for receiving mechanical fasteners 35. In the present embodiment, the centre portion 29 comprises two (2) upper central fixing apertures 33-*n* and two (2) lower central fixing apertures 33-*n*. The mechanical fasteners 35 may, for example, comprise screws or bolts and/or nuts.

The first guide channel 27-1 and the second guide channel 27-2 are configured to receive the first and second interconnecting members 15-1, 15-2 respectively to connect the headrest 3 to the seat back 9. The first guide channel 27-1 and the second guide channel 27-2 are fastened to the mounting bracket 25. In the present embodiment, the first guide channel 27-1 and the second guide channel 27-2 are fastened to the centre portion 29 of the mounting bracket 25. The first guide channel 27-1 and the second guide channel 27-2 are welded to the mounting bracket 25. The first and second guide channels 27-1, 27-2 extend parallel to each other at least substantially parallel to the vertical axis Z. A height adjustment mechanism (not shown) may be associated with at least one of the first and second guide channels 27-1, 27-2 to enable adjustment of the vertical position of the headrest 3 relative to the seat back 9.

The first side portion 31-1 extends in a first lateral direction and is disposed outboard of the first guide channel 27-1. In the illustrated arrangement, the first side portion 31-1 is disposed on a right-hand side of the first guide channel 27-1. The second side portion 31-2 extends in a second lateral direction and is disposed outboard of the second guide channel 27-2. In the illustrated arrangement, the second side portion 31-2 is disposed on a left-hand side of the second guide channel 27-2. The first and second side portions 31-1, 31-2 of the mounting bracket 25 are configured to be fastened to the seat back 9. Each of the first and second side portions 31-1, 31-2 comprise one or more outboard fixing aperture 39-*n* for receiving a mechanical fastener 41-*n*. In the present embodiment, the mechanical fasteners 41-*n* comprise screws for fastening the first and second side portions 31-1, 31-2 to the first cross member 19. The one or more outboard fixing aperture 39-*n* is disposed outboard of the first and second guide channels 27-1, 27-2. In the present embodiment, each of the first and second side portions 31-1, 31-2 comprises two (2) outboard fixing apertures 39-*n*. The outboard fixing apertures 39-*n* are spaced apart from each other vertically and/or transversely. It will be understood that other types of fastener may be used to fasten the mounting bracket 25 to the cross member 23. For example, each mechanical fastener 41-*n* may comprise a rivet or a bolt. Alternatively, or in addition, the mounting bracket 25 could be welded or adhesively bonded to the cross member 23.

The first and second side portions 31-1, 31-2 are inclined relative to the centre portion 29 of the mounting bracket 25. In particular, the first and second side portions 31-1, 31-2 are oriented at an oblique angle relative to the centre portion 29. The first and second side portions 31-1, 31-2 open outwardly towards a front of the seat back 9. The mounting bracket 25 is generally U-shaped in transverse section (i.e., in section perpendicular to the vertical axis Z of the seat back 9).

The first cross member 19 comprises an upper edge 43. An outer flange 45 is formed along the upper edge 43 of the first cross member 19. In the present embodiment, the mounting bracket 25 comprises a bracket upper edge 47 for positioning proximal to the upper edge 43 of the first cross member 19. The bracket upper edge 47 extends across the centre portion 29 and the first and second side portions 31-1, 31-2. An upper bracket flange 49 is formed along the bracket upper edge 47. The upper bracket flange 49 is substantially continuous and is inset from the outer flange 45 when the mounting bracket 25 is mounted to the first cross member 19. The upper bracket flange 49 is at least substantially continuous across the top of the mounting bracket 25. The upper bracket flange 49 extends across the centre portion 29 and each of the first and second side portions 31-1, 31-2. As shown in FIG. 3, the centre portion 29 of the mounting bracket 25 is configured to extend upwardly (i.e., in a direction along the vertical axis Z) from the first and second guide channels 27-1, 27-2. This upwardly extended section of the centre portion 29 is continued into the first and second side portions 31-1, 31-2. This arrangement allows the profile of the mounting bracket 25 to conform more closely to the profile of the first cross member 19. The upper bracket flange 49 is inset from the outer flange 45 across at least substantially the width of the mounting bracket 25. A bracket lower flange (not shown) could optionally be formed along a lower edge of the mounting bracket 25.

Figure 5:
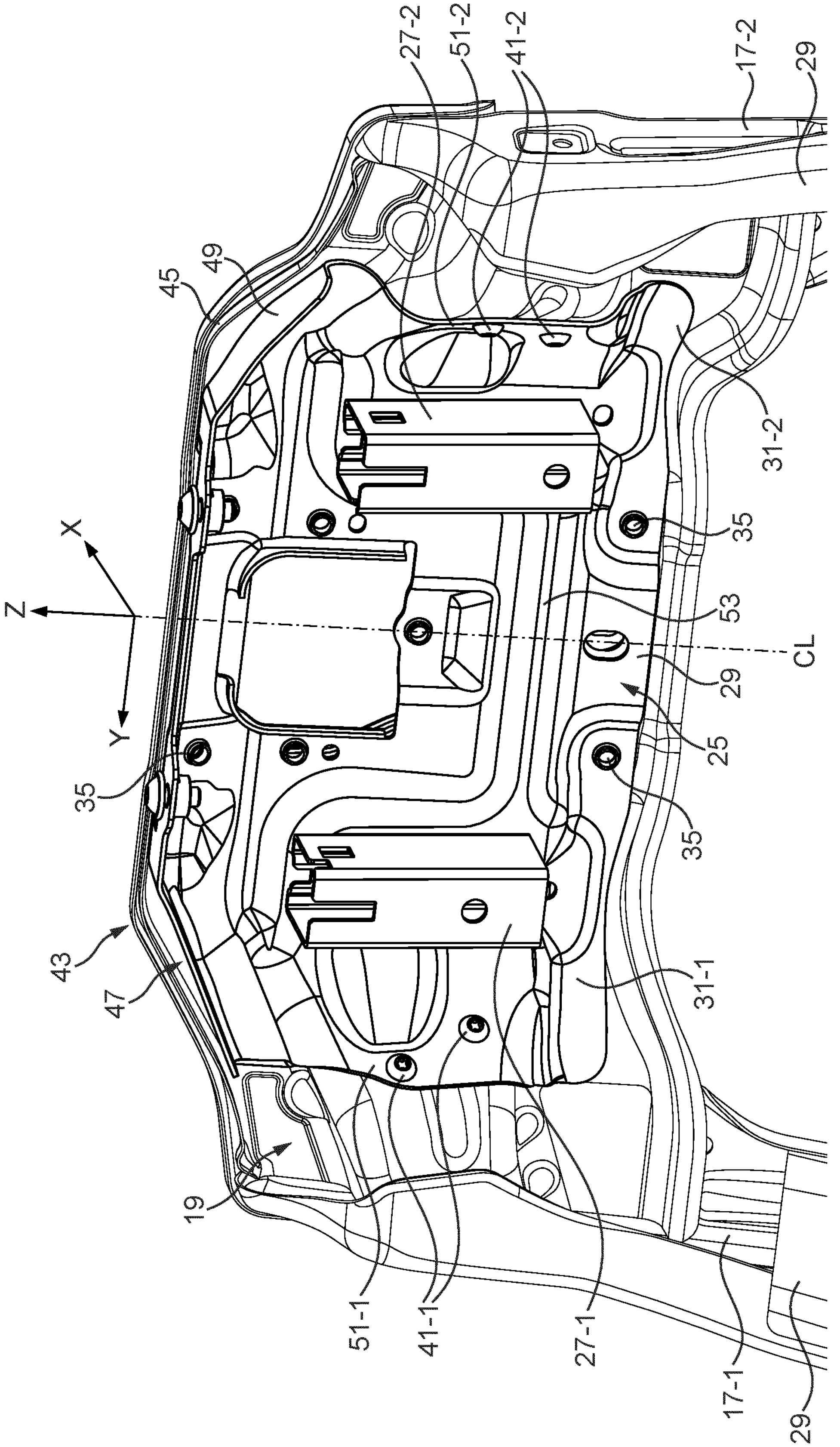
FIG. 5 shows a first perspective view of the headrest mounting assembly with the headrest removed.

As shown in FIG. 5, the first and second side portions 31-1, 31-2 of the mounting bracket 25 comprise respective central platforms 51-1, 51-2. The one or more outboard fixing aperture 39-*n* are formed in the central platforms 51-1, 51-2 of the first and second side portions 31-1, 31-2. The central platforms 51-1, 51-2 are raised relative to the adjacent upper and lower portions of the first and second side portions 31-1, 31-2. The central platforms 51-1, 51-2 are offset towards a front of the seat back 9 relative to the adjacent upper portion and/or the adjacent lower portion of the first and second side portions 31-1, 31-2. The section of each of the first and second side portions 31-1, 31-2 disposed between the respective central platforms 51-1, 51-2 and the upper bracket flange 49 has a concave profile. In the present embodiment, this portion of the mounting bracket 25 is generally C-shaped.

The centre portion 29 of the mounting bracket 25 comprises a ridge 53 for reinforcing the mounting bracket 25. The ridge 53 extends in a transverse direction between the first and second guide channels 27-1, 27-2.

The headrest mounting assembly 1 is mounted to the seat back 9 during assembly of the vehicle seat 5. The mounting bracket 25 is aligned with the first cross member 19. The mounting bracket 25 is fastened in position by the mechanical fasteners 35 disposed in the central fixing apertures 33-*n*, and the mechanical fasteners 41 in the outboard fixing apertures 39-*n*. Once the mounting bracket 25 is installed, the assembly and fabrication of the vehicle seat 5 continues in conventional manner, for example to apply cushioning and upholster the seat back 9. Once assembled, the headrest 3 can be removably located on the seat back 9. In particular, the first and second interconnecting members 15-1, 15-2 are located in the first guide channel 27-1 and the second guide channel 27-2.

The headrest mounting assembly 1 is effective in distributing operational loadings to the seat back 9. The headrest mounting assembly 1 may offer increased stiffness compared to prior art mounting assemblies. The incorporation of the first and second side portions 31-1, 31-2 into the mounting bracket 9 may distribute loading, for example to facilitate the dissipation of energy in the event of a collision. The peak load applied to the mounting bracket 9 may be reduced. At least in certain embodiments, the headrest mounting assembly 1 may offer improved safety characteristics for an occupant of the vehicle seat 3. For example, the headrest mounting assembly 1 may help to reduce soft tissue injury (also known as whiplash) to the occupant's neck in the event of a collision, for example a rear-end collision at a speed in the range 16 km/h to 24 km/h.

It will be appreciated that various changes and modifications can be made to the present invention without departing from the scope of the present application.

The invention claimed is:

1. A headrest mounting assembly for mounting a headrest on a frame member of a seat back, the headrest mounting assembly comprising:

a mounting bracket comprising a centre portion, a first side portion and a second side portion; and a first guide channel for receiving a first headrest interconnecting member, and a second guide channel for receiving a second headrest interconnecting member, the first and second guide channels being fastened to the centre portion of the mounting bracket;

wherein the first side portion is disposed outboard of the first guide channel on a first side of the mounting bracket, and the second side portion is disposed outboard of the second guide channel on a second side of the mounting bracket; and each of the first and second side portions being configured to be fastened to the seat back outboard of the first and second guide channels respectively, wherein each of the first and second side portions comprise a central platform, an upper portion, and a lower portion, wherein the central platform is raised relative to at least one of the upper region portion and the lower-region portion.

2. The headrest mounting assembly as claimed in claim 1, wherein the first and second side portions are inclined relative to the centre portion of the mounting bracket.

3. The headrest mounting assembly as claimed in claim 2, wherein the first and second side portions open outwardly towards a front of the seat back.

4. The headrest mounting assembly as claimed in claim 2, wherein the mounting bracket is U-shaped in a transverse section.

5. The headrest mounting assembly as claimed in claim 1, wherein each of the first and second side portions comprises at least one aperture for receiving a mechanical fastener to fasten the mounting bracket to the seat back.

6. The headrest mounting assembly as claimed in claim 2, wherein the mounting bracket comprises a bracket upper edge for positioning proximal to an upper edge of the frame member of the seat back, the bracket upper edge extending across the centre portion and the first and second side portions.

7. The headrest mounting assembly as claimed in claim 6, wherein an upper bracket flange is formed along the bracket upper edge of the mounting bracket, the upper bracket flange being continuous.

8. The headrest mounting assembly as claimed in claim 6, wherein the centre portion of the mounting bracket extends upwardly from the first and second guide channels to the bracket upper edge.

9. The headrest mounting assembly as claimed in claim 1, wherein the centre portion comprises a ridge extending in a transverse direction between the first and second guide channels.

10. The headrest mounting assembly as claimed in claim 1, wherein the mounting bracket comprises a plate having a unitary composition.

11. The headrest mounting assembly as claimed in claim 1, wherein the centre portion comprises a plurality of apertures for fastening the mounting bracket to the seat back.

12. A vehicle seat comprising the headrest mounting assembly as claimed in claim 1.

13. A vehicle comprising one or more vehicle seat as claimed in claim 12.

* * * * *